United States Patent
Duran Gonzalez et al.

(10) Patent No.: US 9,886,318 B2
(45) Date of Patent: Feb. 6, 2018

(54) APPARATUSES AND METHODS TO TRANSLATE A LOGICAL THREAD IDENTIFICATION TO A PHYSICAL THREAD IDENTIFICATION

(71) Applicant: Intel Corporation, Santa Clara, CA (US)

(72) Inventors: Alejandro Duran Gonzalez, Barcelona (ES); Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 114 days.

(21) Appl. No.: 15/055,234

(22) Filed: Feb. 26, 2016

(65) Prior Publication Data

US 2016/0283278 A1 Sep. 29, 2016

(30) Foreign Application Priority Data

Mar. 27, 2015 (EP) .................................... 15382151

(51) Int. Cl.
*G06F 9/455* (2006.01)
*G06F 9/50* (2006.01)
*G06F 9/38* (2006.01)

(52) U.S. Cl.
CPC .......... *G06F 9/5027* (2013.01); *G06F 9/3851* (2013.01); *G06F 9/455* (2013.01); *G06F 9/4552* (2013.01)

(58) Field of Classification Search
None
See application file for complete search history.

(56) References Cited

U.S. PATENT DOCUMENTS

| 7,802,073 B1 | 9/2010 | Cheng et al. |
| 2005/0149700 A1* | 7/2005 | Samra .................. G06F 9/3851 712/220 |

(Continued)

FOREIGN PATENT DOCUMENTS

GB    2485019 A    5/2012

OTHER PUBLICATIONS

Extended European Search Report from European Patent Application No. 15382151.7, dated Sep. 22, 2015, 8 pages.

*Primary Examiner* — Dong Kim
(74) *Attorney, Agent, or Firm* — Nicholson De Vos; Webster & Elliott LLP

(57) ABSTRACT

Methods and apparatuses relating to translating a logical thread identification to a physical thread identification. A processor may include a plurality of cores that include a buffer, and a thread mapping hardware unit to: return a physical thread identification in response to a logical thread identification sent to a buffer of a first core when the buffer includes a logical to physical thread mapping for the logical thread identification, and send a request to the buffers of the other cores when the first core's buffer does not include the logical to physical thread mapping for the logical thread identification, wherein each of the other cores are to send an unknown identification response if their buffer does not include the logical thread identification and at least one of the other cores is to send the physical thread identification to the first core if its buffer includes the logical thread identification.

20 Claims, 12 Drawing Sheets

(56) References Cited

U.S. PATENT DOCUMENTS

| | | | | |
|---|---|---|---|---|
| 2010/0274961 A1* | 10/2010 | Golla | .................... | G06F 9/384 |
| | | | | 711/108 |
| 2010/0274993 A1* | 10/2010 | Golla | ................ | G06F 9/30109 |
| | | | | 712/216 |
| 2013/0262816 A1* | 10/2013 | Ronen | ................ | G06F 12/1027 |
| | | | | 711/207 |

* cited by examiner

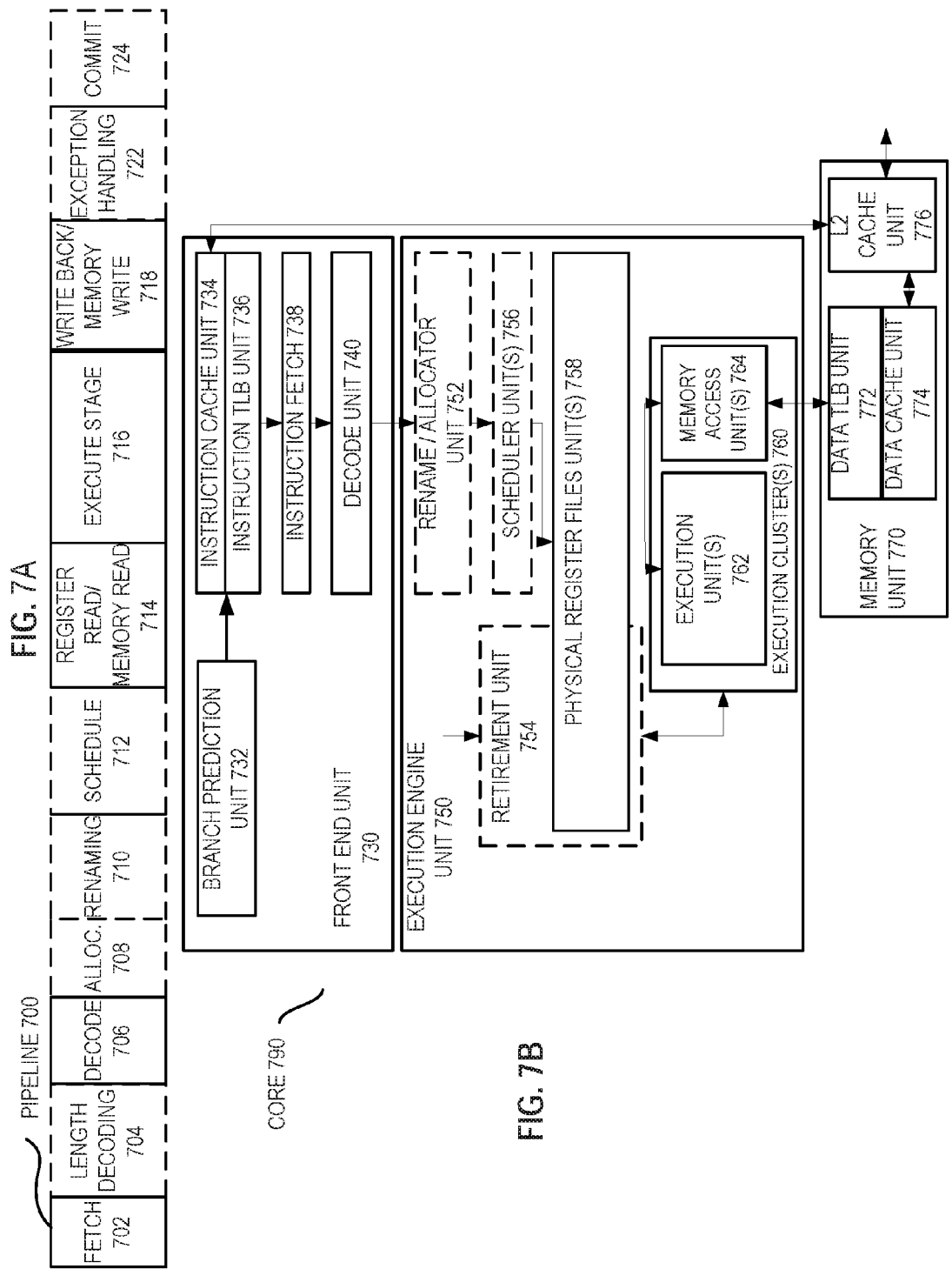

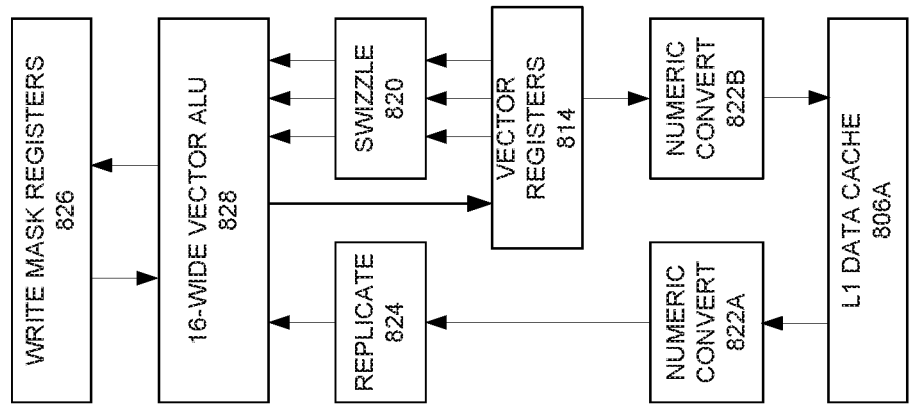
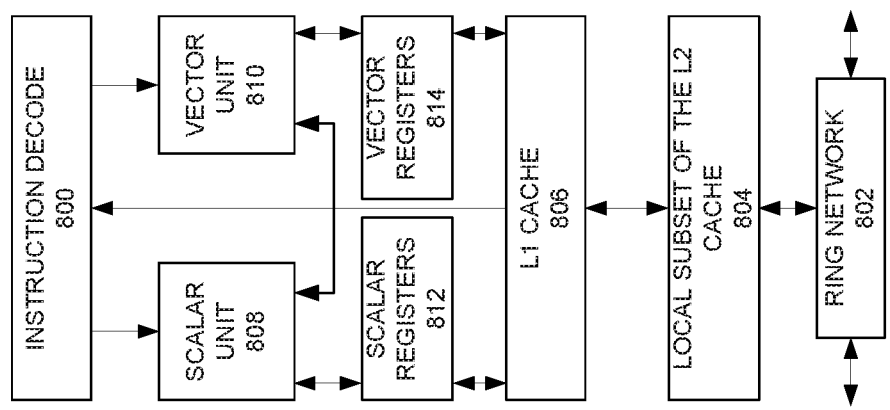

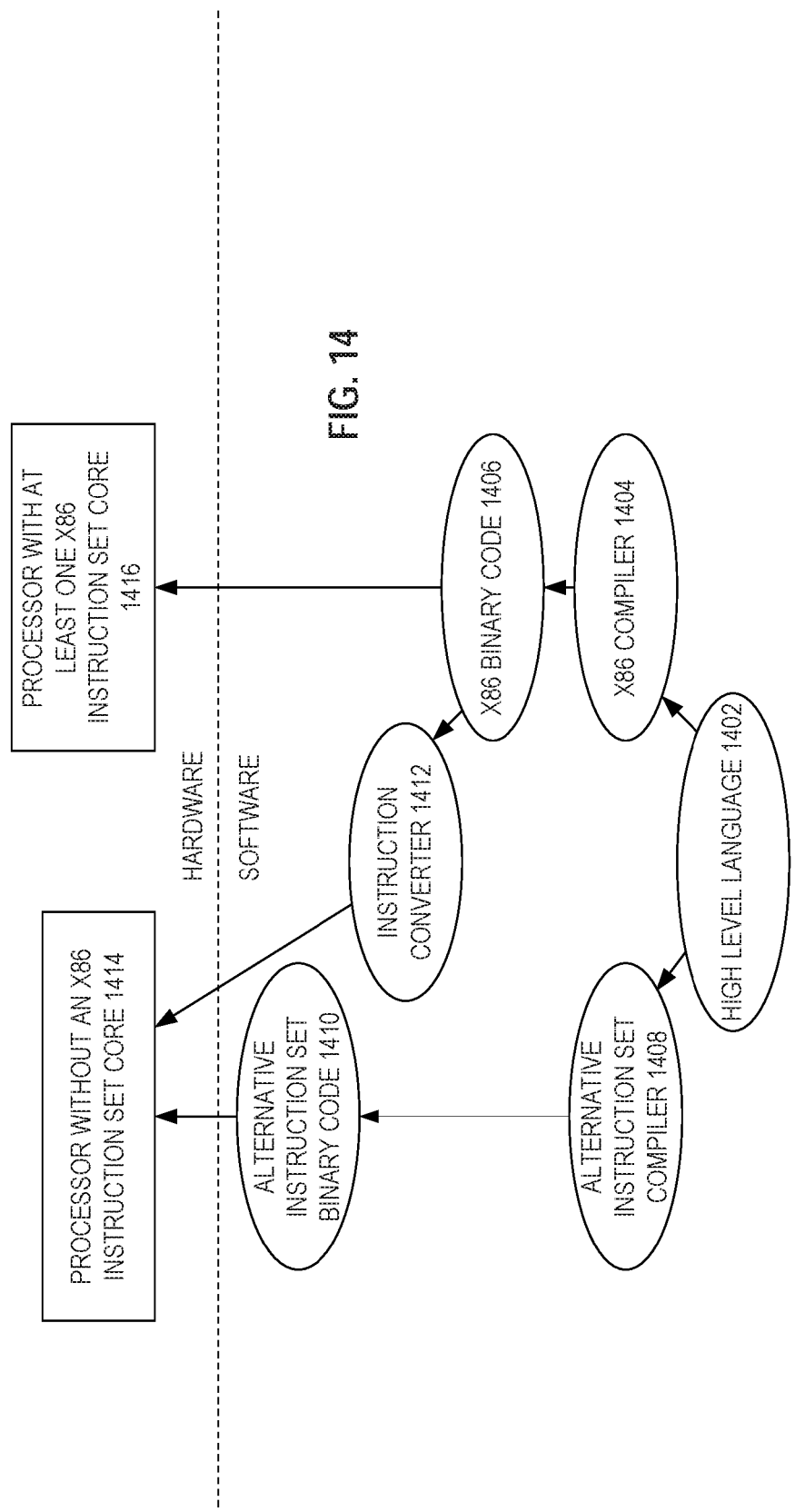

APPARATUSES AND METHODS TO TRANSLATE A LOGICAL THREAD IDENTIFICATION TO A PHYSICAL THREAD IDENTIFICATION

CROSS REFERENCE TO RELATED APPLICATIONS

The present application claims priority under 35 U.S.C. §119 to European Patent Application No. EP15382151.7, filed Mar. 27, 2015 and titled "Apparatuses and Methods to Translate a Logical Thread Identification to a Physical Thread Identification", which is incorporated herein by reference in its entirety.

TECHNICAL FIELD

The disclosure relates generally to electronics, and, more specifically, an embodiment of the disclosure relates to translating a logical thread identification to a physical thread identification.

BACKGROUND

A processor, or set of processors, executes instructions from an instruction set, e.g., the instruction set architecture (ISA). Instructions (e.g., code) to be executed may be separated into multiple threads for execution by various processor resources. Multiple threads may be executed in parallel. Further, a processor may utilize out-of-order execution to execute instructions, e.g., as the input(s) for such instructions are made available. Thus, an instruction that appears later in program order (e.g., in code sequence) may be executed before an instruction appearing earlier in program order.

BRIEF DESCRIPTION OF THE DRAWINGS

The present disclosure is illustrated by way of example and not limitation in the figures of the accompanying drawings, in which like references indicate similar elements and in which:

FIG. 7A is a block diagram illustrating both an exemplary in-order pipeline and an exemplary register renaming, out-of-order issue/execution pipeline according to embodiments of the disclosure.

FIG. 7B is a block diagram illustrating both an exemplary embodiment of an in-order architecture core and an exemplary register renaming, out-of-order issue/execution architecture core to be included in a processor according to embodiments of the disclosure.

FIG. 8A is a block diagram of a single processor core, along with its connection to the on-die interconnect network and with its local subset of the Level 2 (L2) cache, according to embodiments of the disclosure.

FIG. 8B is an expanded view of part of the processor core in FIG. 8A according to embodiments of the disclosure.

FIG. 14 is a block diagram contrasting the use of a software instruction converter to convert binary instructions in a source instruction set to binary instructions in a target instruction set according to embodiments of the disclosure.

DETAILED DESCRIPTION

Figure 1:
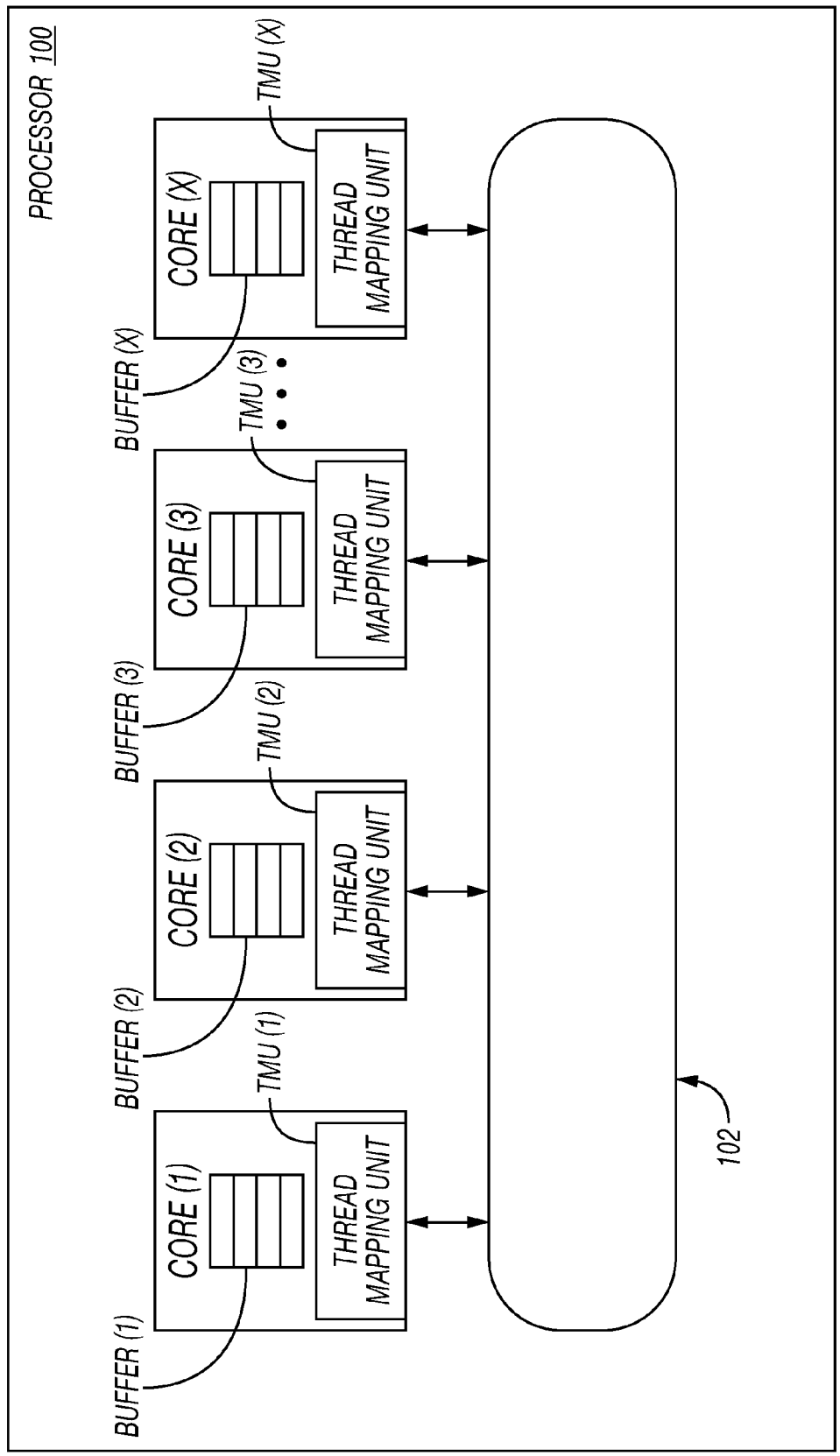
FIG. 1 illustrates a processor to translate a logical thread identification to a physical thread identification according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decode unit (decoder) decoding macro-instructions. A processor (e.g., having one or more cores to decode and/or execute instructions) may operate on data, for example, in performing arithmetic, logic, or other functions.

Instructions may be separated into different threads (e.g., threads of execution). A thread may generally refer to the smallest sequence (e.g., stream) of instructions that may be managed independently, e.g., by a scheduler, for execution.

A scheduler may schedule execution of instructions of a thread on a core of the processor. A logical (e.g., virtual) thread may generally refer to the thread that is visible from (e.g., managed by) the code. Code may include software such as an operating system (OS). A physical thread may generally refer to the physical components of a processor (e.g., of a core thereof) that execute the logical thread. Thread mapping may indicate the physical thread that is to execute a logical thread. In one embodiment, a single logical thread may be assigned (e.g., for execution) to a single physical thread, e.g., a one-to-one correspondence.

Logical thread to physical thread mapping may be discussed below with a one-to-one correspondence, but embodiments of this disclosure are not limited thereto. A logical thread may be mapped (e.g., assigned for execution) to a physical thread by a hardware scheduler, software (e.g., application code or OS code) scheduler, by software itself (e.g., the software code including the mapping), or any combination thereof. A logical thread to physical thread mapping may only be visible to the code (e.g., software) and not the hardware. A physical thread may include a physical thread identification (e.g., an identification number or name) A logical thread may include a logical thread identification (e.g., an identification number or name). An identification number may be a multiple bit binary number. In certain embodiments (e.g., in high-performance computing (HPC)), different logical (e.g., virtual) threads of a software application are each mapped (e.g., bound) at the beginning of execution (e.g., of the OS) to a particular physical thread of the processor(s), e.g., in a one-to-one mapping.

Knowledge of the logical thread to physical thread mapping (e.g., via which physical thread identification is mapped to a logical thread identification) may be desirable, for example, to optimize synchronization and/or communications between the different processes and threads. As a further example, such information may be used to assign a logical thread to a physical thread of a processor's core (e.g., for processor core affinity), for example, so that the logical thread will execute (e.g., only) on the designated physical thread (or its core), e.g., to utilize certain remaining information (e.g., in that core's data cache) from a previous logical thread executed on that physical thread (or its core). However, the cost (e.g., in time, power, and/or processor resources) of accessing the logical thread to physical thread mapping (e.g., from a main system or cache memory) may offset the benefits that may be obtained.

Certain embodiments of this disclosure allow a fast (e.g., less than about 5, 10, or 20 processor clock cycles) translation between input of one of a logical thread identification (ID) or a physical thread identification (ID) and the output of the other of the logical thread ID or physical thread ID according to that logical thread to physical thread mapping. In one embodiment, a logical thread identification may be input (e.g., into hardware) and the output may be the physical thread identification according to that (e.g., current) logical thread to physical thread mapping. Certain embodiments of this disclosure support translation of both code (e.g., software applications) that use a single model of parallelism as well as code that uses hybrid models by using logical (e.g., OS) thread IDs.

One embodiment of a (e.g., hardware) processor of this disclosure includes a (e.g., lookaside) buffer (e.g., not in cache memory) to allow input of one of a logical thread ID and a physical thread ID that are mapped together and output the other of the logical thread ID and the physical thread ID, for example, with a thread mapping (e.g., hardware) unit of a processor (e.g., logic thereof). Input of a single logical thread ID may cause an output of a single physical thread ID (e.g., in one-to-one correspondence embodiments) or multiple physical IDs (e.g., if the logical thread is bound to multiple physical threads).

Buffer may be a component of the core of a processor, e.g., not separate from the core. Buffer may be other memory that is not in the processor's cache memory (e.g., memory that is separate from the cache memory). Communication resources to communicate between core(s) and/or a thread mapping unit may be reserved for those communications (e.g., separate from other communications). Communication resources may be an electrical conductor extending between any two or more components. A thread mapping unit may include hardware, software, firmware, or any combination thereof.

FIG. 1 illustrates a processor 100 to translate a logical thread identification to a physical thread identification according to embodiments of the disclosure. Processor may include multiple cores. Depicted processor 100 includes core(1), core(2), core(3), and core(x) to indicate any number of cores may be utilized (where x may be any positive integer). A core may communicate with any or all combinations and/or all of the other cores of the processor, e.g. to receive and/or send a message to other components (e.g., core(s)) of the processor. Communication resources of processor 100 are depicted as a communication network 102 (e.g., shown as, but not required to be, a ring network). Communication resources may be reserved for only the communications to translate a logical thread identification to a physical thread identification or may be used for other communications as well. Each core may access the communication network 102, e.g. to receive data from other components (e.g., core(s)) and/or send data to other components (e.g., core(s)) via the communication network 102. A core may include communication components to send and/or receive data on the communication network 102.

Each core may include its own respective buffer, e.g., buffer(1), buffer(2), buffer(3), and buffer(x) to indicate any number of buffers may be utilized (where x may be any positive integer). Buffer may include, e.g., as one embodiment, an entry for a physical thread ID and its corresponding logical thread ID(s) for a logical to physical thread mapping. Buffer may be a component of the core itself, e.g., not part of the cache memory of a core or processor. Buffer may include any number of entries and is not to be limited to the examples shown in the Figures.

Each core may include its own thread mapping (e.g., hardware) unit, e.g., TMU(1), TMU(2), TMU(3), and TMU(x) to indicate any number of thread mapping units may be utilized (where x may be any positive integer). Thread mapping unit may include logic to output a physical thread ID (e.g., onto communication network 102 in response to a request for that physical thread ID). Thread mapping unit may communicate (e.g., only) with its core's buffer. Thread mapping unit may communicate with other cores' buffers. Thread mapping unit may communicate with other cores' thread mapping units.

In one embodiment, a request (for example, sent from code (e.g., OS or other software application) may be received by a (e.g., single) core to return a physical thread identification in response to a logical thread identification sent. Referring to FIG. 1, if core(1) received the request (e.g., received the logical thread ID), core(1) may proceed to check its buffer(1) for a (e.g., valid) logical to physical thread mapping to determine (e.g., in fewer than about 2, 3, 4, 5, 10, or 20 clock cycles of the processor) the according physical thread ID for that logical thread ID (e.g., via its thread mapping unit TMU(1)). If the core's buffer(1) does not have a (e.g., valid) logical to physical thread mapping entry for the logical thread ID, then core(1) (e.g., its thread mapping unit TMU(1)) may send a request to (e.g., all) other cores, for example, to have their buffers searched for the (e.g., valid) logical to physical thread mapping entry for the logical thread ID. The thread mapping units of these other cores may receive this request from the core(1) over the communication resources (e.g., communication network 102). This request may be simultaneously broadcast from core(1) (e.g. from its thread mapping unit (TMU(1)). If one of the cores (e.g., core(2), core(3) . . . core(x)) includes a (e.g., valid) logical to physical thread mapping entry for the logical thread ID in its respective buffer, that core may then send (e.g., via its thread mapping unit) the physical thread ID back to requesting core(1). Requesting core(1) may then update its buffer(1) with that physical thread ID (e.g., in an entry in the buffer that indicates the mapping of that physical thread ID to its mapped logical thread ID). If the buffer is full (e.g., detected via the thread mapping unit), it may clear out space (e.g., an entry) for the update. In one embodiment, an entry in the buffer may include its age (e.g., relative to the other entries), and the least recently used entry may be deleted to allow that space to be used. Other algorithms to clear space may be used, such as, but not limited to, deleting the least frequently used entry.

Multiple of the requested cores (e.g., core(2), core(3) . . . core(x)) may include a (e.g., valid) logical to physical thread mapping entry for the logical thread ID in its respective buffer. Each core may send (e.g., via its thread mapping unit) the physical thread ID back to requesting core(1). In one embodiment, requesting core(1) may only update one entry in its buffer with that physical thread ID (e.g., in an entry in the buffer that indicates the mapping of that physical thread ID to its mapped logical thread ID), for example, the other physical thread ID messages sent to the requesting core may be discarded or they may write over the same entry in buffer(1).

A core that does not include a (e.g., valid) logical to physical thread mapping entry for the logical thread ID in its buffer may send (e.g., via its thread mapping unit) a message indicating that back to requesting core (e.g., an "unknown identification" message).

In one embodiment, if no core's buffer has an entry for the provided logical thread ID, requesting core(1) may send a message indicating this, e.g., to the original requestor, for example, to the requesting code (e.g., OS or other software application). The code may then take the appropriate action, e.g., by the code (e.g., after clearing an entry in a buffer) updating an entry in a core's buffer with the logical thread ID and physical thread ID that are mapped together. A core's thread mapping unit may send and/or receive messages, e.g., from software or hardware. A core's thread mapping unit may check and/or update its buffer, e.g., and send messages based on those checks and/or updates.

In one embodiment, requesting core(1) (e.g., via its thread mapping unit) is to track the outstanding requests to the other cores, e.g., requests for a hardware thread ID. In one embodiment, requesting core may keep an entry (e.g., in its buffer) to account for the quantity of messages expected as response from the other cores (e.g., the number or other cores). Each time a response arrives, this entry may be updated (e.g., a counter may be decremented). This entry may be cleared (e.g., deleted) once the outstanding requests are received (e.g., when no response pending is missing).

Figure 2:
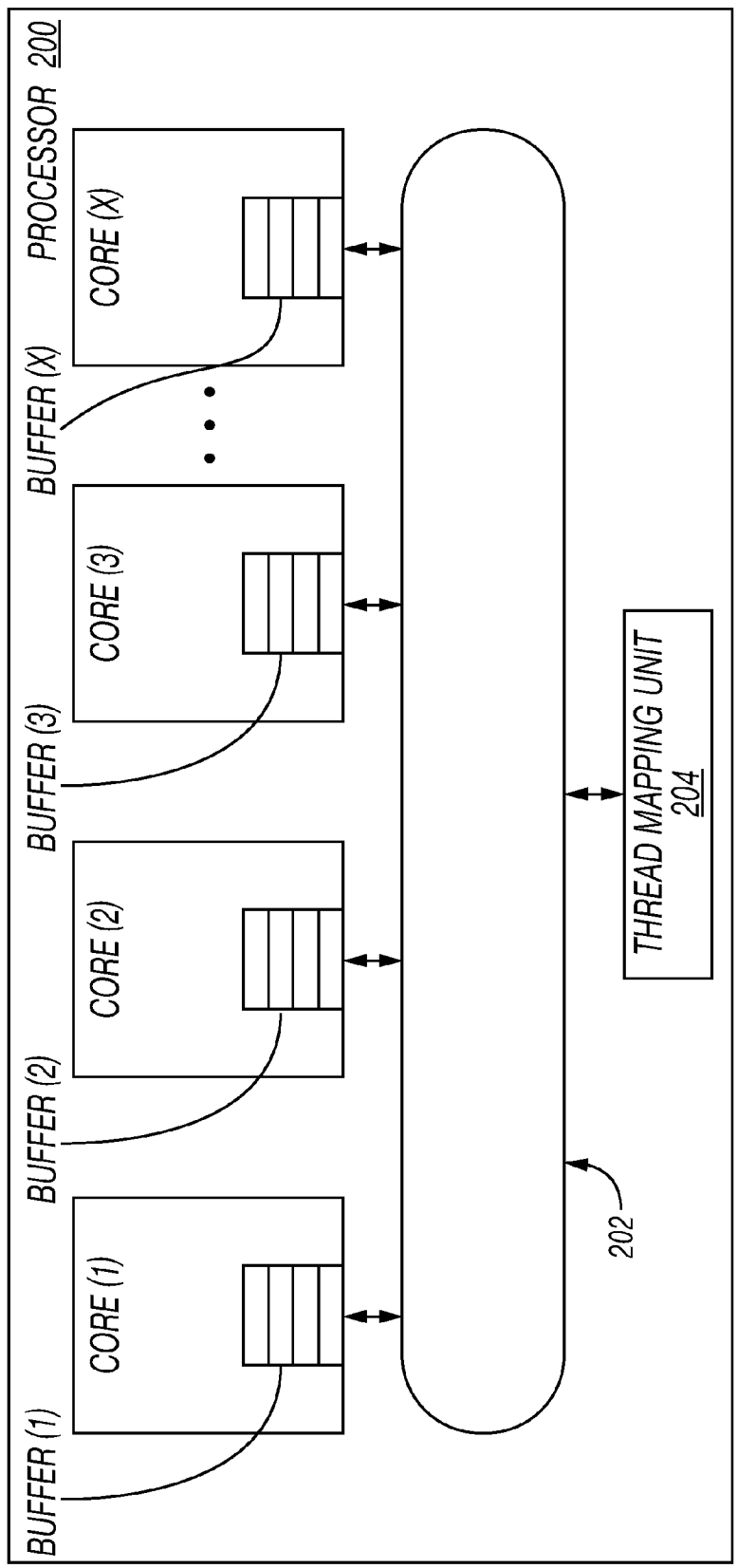
FIG. 2 illustrates a processor to translate a logical thread identification to a physical thread identification according to embodiments of the disclosure.

FIG. 2 illustrates a processor 200 to translate a logical thread identification to a physical thread identification according to embodiments of the disclosure. Processor 200 may include a single (e.g., centralized) thread mapping unit 204. Although not depicted, processor 100 of FIG. 1 may additionally include a thread mapping unit 204 on its communication network 102. Depicted processor 200 includes core(1), core(2), core(3), and core(x) to indicate any number of cores may be utilized (where x may be any positive integer). A core may communicate with any or all combinations and/or all of the other cores of the processor and the thread mapping unit 204, e.g. to receive and/or send a message to other components (e.g., core(s)) of the processor. Communication resources of processor 200 are depicted as a communication network 202 (e.g., shown as, but not required to be, a ring network). Communication resources may be reserved for only the communications to translate a logical thread identification to a physical thread identification or may be used for other communications as well. Each core may access the communication network 202, e.g. to receive data from other components (e.g., core(s) and/or thread mapping unit 204) and/or send data to other components (e.g., core(s) and/or thread mapping unit 204) via the communication network 202. A core and/or thread mapping unit 204 may include communication components to send and/or receive data on the communication network 202.

Each core may include its own respective buffer, e.g., buffer(1), buffer(2), buffer(3), and buffer(x) to indicate any number of buffers may be utilized (where x may be any positive integer). Buffer may include, e.g., as one embodiment, an entry for a physical thread ID and its logical thread ID(s) for its logical to physical thread mapping. Buffer may be a component of the core itself, e.g., not part of the cache memory of a core or processor. Buffer may include any number of entries and is not to be limited to the examples shown in the Figures.

A processor may include a (e.g., single) thread mapping (e.g., hardware) unit 204. Thread mapping unit may include logic to output a physical thread ID (e.g., onto communication network 102 in response to a request for that physical thread ID). Thread mapping unit may communicate with each core's buffer. Thread mapping unit may default to searching one core's buffer first. Thread mapping unit may have its own buffer (e.g., to keep a copy of the data in core(1)'s buffer).

In one embodiment, a request (for example, sent from code (e.g., OS or other software application) may be received by a (e.g., single) core or the thread mapping unit to return a physical thread identification in response to a logical thread identification sent. Referring to FIG. 2, if core(1) received the request (e.g., received the logical thread ID), core(1) may proceed to check its buffer(1) for a (e.g., valid) logical to physical thread mapping to determine (e.g., in fewer than about 10 or 20 clock cycles of the processor) the according physical thread ID for that logical thread ID (or thread mapping unit may check its buffer if it has a copy of the data in core(1)'s buffer). If the core's buffer(1) does not have a (e.g., valid) logical to physical thread mapping entry for the logical thread ID, then core(1) may (e.g., cause thread mapping unit 204 to) send a request to (e.g., all) other cores, for example, to have their buffers searched for the (e.g., valid) logical to physical thread mapping entry for the logical thread ID. The buffers of these other cores may receive this request from the core(1) over the communication resources (e.g., communication network 202). This request may be simultaneously broadcast from core(1) or from thread mapping unit 204. If one of the cores (e.g., core(2), core(3) . . . core(x)) includes a (e.g., valid) logical to physical thread mapping entry for the logical thread ID in its respective buffer, that core may then send (e.g., via thread mapping unit 204 and/or communication network 202) the physical thread ID back to requesting core(1). Requesting core(1) may then update its buffer(1) with that physical thread ID (e.g., in an entry in the buffer that indicates the mapping of that physical thread ID to its mapped logical thread ID). If the buffer is full, it (e.g., via the thread mapping unit) may clear out space (e.g., an entry) for the update. In one embodiment, an entry in the buffer may include its age (e.g., relative to the other entries), and the least recently used entry may be deleted to allow that space to be used. Other algorithms to clear space may be used, such as, but not limited to, deleting the least frequently used entry.

Multiple of the requested cores (e.g., core(2), core(3) . . . core(x)) may include a (e.g., valid) logical to physical thread mapping entry for the logical thread ID in its respective buffer. Each core may send (e.g., via thread mapping unit 204 and/or communication network 202) the physical thread ID back to requesting core(1). In one embodiment, requesting core(1) may only update one entry in its buffer with that physical thread ID (e.g., in an entry in the buffer that indicates the mapping of that physical thread ID to its mapped logical thread ID), for example, the other physical thread ID messages sent to the requesting core may be discarded or write over the same entry in buffer(1).

A core that does not include a (e.g., valid) logical to physical thread mapping entry for the logical thread ID in its buffer may then send (e.g., via thread mapping unit and 202/or communication network 202) a message indicating that back to requesting core (e.g., an "unknown identification" message).

In one embodiment, if no core's buffer has an entry for the provided logical thread ID, requesting core(1) and/or thread mapping unit 204 may send a message indicating this, e.g., to the original requestor, for example, the requesting code (e.g., OS or other software application). The code may then take the appropriate action, e.g., by the code (e.g., after clearing an entry in a buffer) updating an entry in a core's buffer with the logical thread ID and physical thread ID that are mapped together. A core's thread mapping unit may send and/or receive messages thereto. A core's thread mapping unit may check and/or update its buffer, e.g., and send messages based on those checks and/or updates.

In one embodiment, requesting core(1) and/or thread mapping unit 204 is to track the outstanding requests to the other cores, e.g., for the hardware thread ID. In one embodiment, requesting core and/or thread mapping unit 204 may keep an entry (e.g., in its buffer) to accounts for the amount of messages expected as response for the other cores (e.g., the number or other cores). Each time a response arrives, this entry may be updated (e.g., a counter may be decremented). This entry may be cleared (e.g., deleted) once the outstanding requests are received (no response pending is missing).

Figure 3:
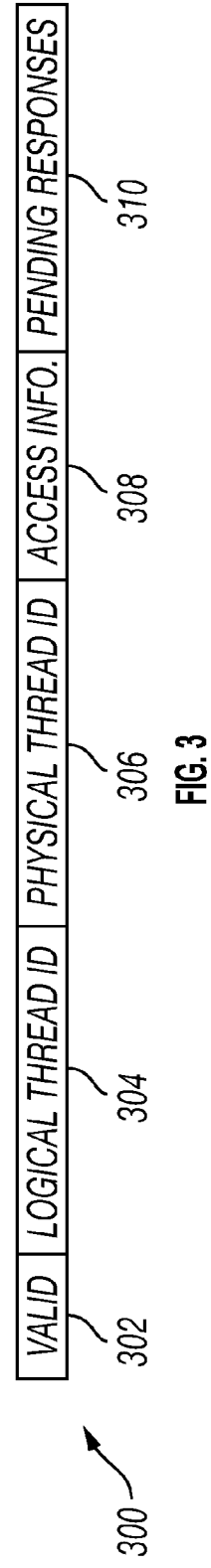
FIG. 3 illustrates a data entry format according to embodiments of the disclosure.

FIG. 3 illustrates a data entry format 300 according to embodiments of the disclosure. Although multiple fields are depicted, any one or combination of the fields may be used as a data entry format, e.g., of a buffer's entries. A field may contain one more bits. Valid field 302 may indicate (e.g., via a binary high or binary low) that the logical to physical thread mapping in that entry is still valid. Logical thread identification (ID) field 304 may indicate (e.g., as an immediate value) the logical thread ID and its corresponding physical thread identification (ID) field 306 may indicate (e.g., as an immediate value) the physical thread ID for the logical to physical thread mapping represented by that entry. Access information (info.) field 308 may include information such as the age or frequency of that entry being accessed. Pending responses field 310 may be used to account for the amount of messages expected as responses from the other cores (e.g., as a counter).

Certain actions of this disclosure may be caused by the execution of one or more instructions. For example, a (e.g., ring 0 or highest privileges) instruction may allow software (e.g., OS) to manage the buffers. A first instruction may allow software to add and/or modify buffer entries, e.g., as in FIG. 4. A second instruction may allow software to invalidate entries in all cores which refer to a given logical (e.g., OS) thread, e.g., as in FIG. 5. In one embodiment, the message depicted in FIGS. 4 and 5 may be uncore message in a processor with an uncore.

Figure 4:
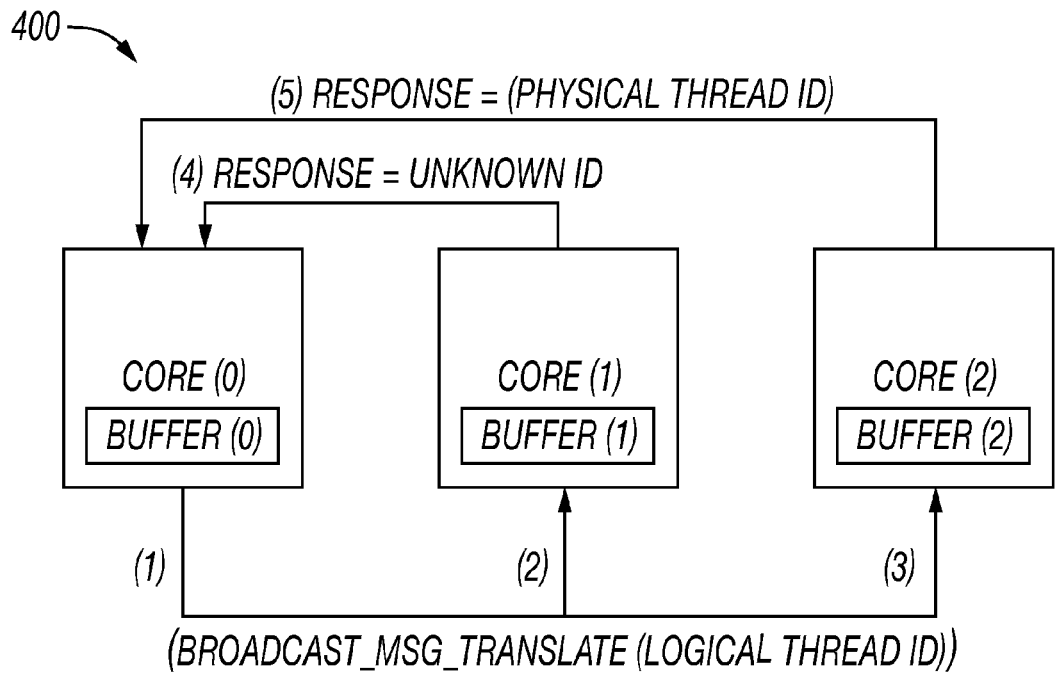
FIG. 4 is a block diagram of translating a logical thread identification to a physical thread identification according to embodiments of the disclosure.

FIG. 4 is a block diagram 400 of translating a logical thread identification to a physical thread identification according to embodiments of the disclosure. Multiple cores of a processor (or processors) each have a respective buffer. Core(0) may have checked its buffer(0) for a physical thread identification mapped to a provided logical thread identification. Core(0) may then request other cores (core(1) and core(2)) to check their respective buffers (buffer(1) and buffer(2)) for a physical thread identification mapped to a provided logical thread identification to provide the translation from the logical thread ID to the physical thread ID. If core(1)'s buffer does not include a (e.g., valid) entry for the logical thread ID, it may respond to core(0) accordingly (e.g., "unknown ID"). If core(2)'s buffer does include a (e.g., valid) entry for the logical thread ID, it may respond to core(0) accordingly with the physical thread ID (e.g., "HW ID").

Figure 5:
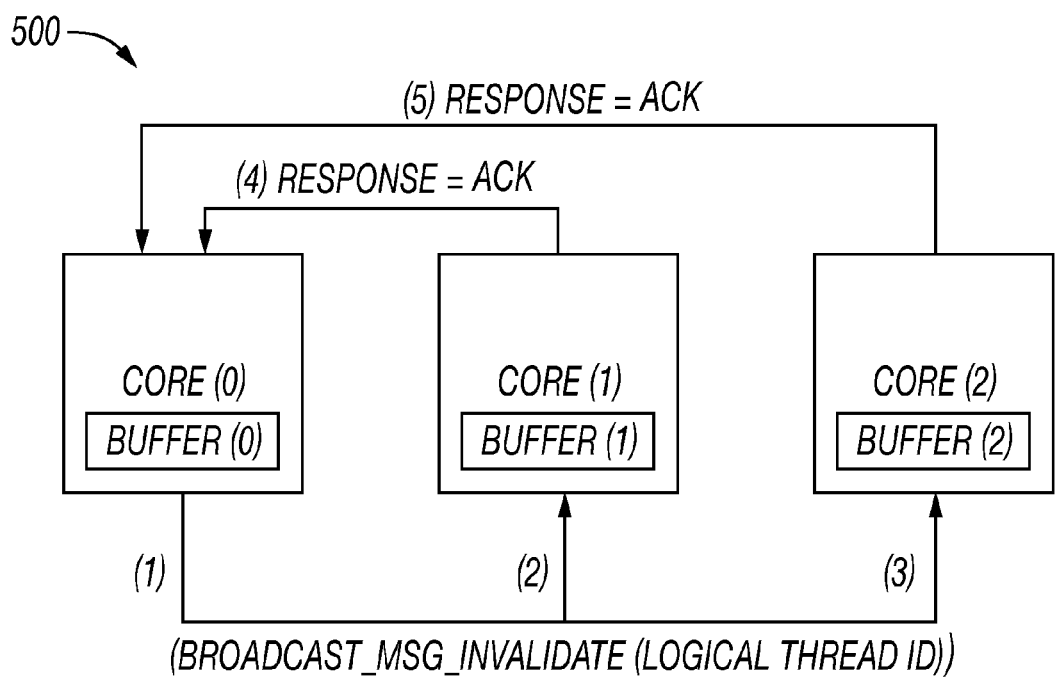
FIG. 5 is a block diagram of invalidating a logical thread identification to physical thread identification mapping according to embodiments of the disclosure.

FIG. 5 is a block diagram 500 of invalidating a logical thread identification to physical thread identification mapping according to embodiments of the disclosure. Multiple cores of a processor (or processors) each have a respective buffer. Core(0) may have invalidated all entries in its buffer (0) for a physical thread identification mapped to a logical thread identification. Core(0) may then request other cores (core(1) and core(2)) to invalidate their respective buffers (buffer(1) and buffer(2)) for that physical thread identification mapped to the logical thread identification. Core(1)'s buffer and core(2)' may acknowledge ("ack") (e.g., acknowledge receipt or completion) of the request from core(0). Invalidation may invalidate an entry by having the entry searched for either or both of a logical thread ID or physical thread ID, for example, as part of a broadcast message to the other cores.

In one embodiment, the code (e.g., OS or other software application) may update a (e.g., each) core's buffer each time the mapping (e.g., binding) between a logical (e.g., OS or other software application) thread and physical (e.g., hardware) thread changes (or the first time it is done). The code may also use an invalidation instruction (e.g., see FIG. 5 and its associated text) when code (e.g., OS or other software applications) threads terminate or are unbound. A third instruction (e.g., that not be privileged) may allow the code (e.g., OS or other software applications) to provide as its output a physical thread ID (e.g., in a register) in response to the input of a logical thread ID (e.g., in another or the same register), for example, according to the apparatuses and methods of this disclosure.

Figure 6:
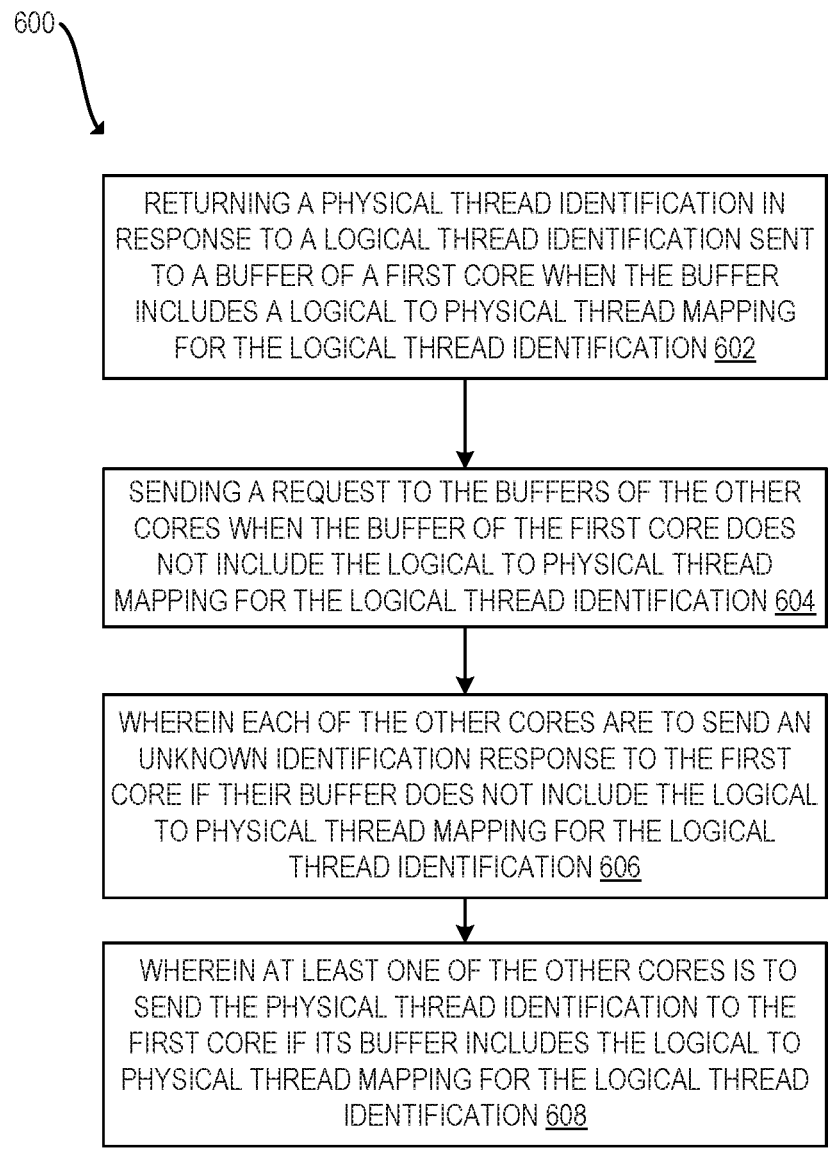
FIG. 6 illustrates a flow diagram of translating a logical thread identification to a physical thread identification according to embodiments of the disclosure.

FIG. 6 illustrates a flow diagram 600 of translating a logical thread identification to a physical thread identification according to embodiments of the disclosure. Depicted flow diagram 600 includes returning a physical thread identification in response to a logical thread identification sent to a buffer of a first core when the buffer includes a logical to physical thread mapping for the logical thread identification 602 (wherein the first core is one of a plurality of cores of a hardware processor that each include a buffer to store a logical to physical thread mapping); sending a request to the buffers of the other cores when the buffer of the first core does not include the logical to physical thread mapping for the logical thread identification 604; wherein each of the other cores are to send an unknown identification response to the first core if their buffer does not include the logical to physical thread mapping for the logical thread identification 606; and at least one of the other cores is to send the physical thread identification to the first core if its buffer includes the logical to physical thread mapping for the logical thread identification 608. A hardware processor may utilize the flow diagram of FIG. 6.

In one embodiment, a hardware processor includes a plurality of cores that each include a buffer to store a logical to physical thread mapping, and a thread mapping hardware unit to: return a physical thread identification in response to a logical thread identification sent to a buffer of a first core when the buffer includes a logical to physical thread mapping for the logical thread identification, and send a request to the buffers of the other cores when the buffer of the first core does not include the logical to physical thread mapping for the logical thread identification, wherein each of the other cores are to send an unknown identification response if their buffer does not include the logical to physical thread mapping for the logical thread identification and at least one of the other cores is to send the physical thread identification to the first core if its buffer includes the logical to physical thread mapping for the logical thread identification. The thread mapping hardware may simultaneously broadcast the request to the buffers of the other cores. A least recently used entry in the buffer of the first core may be replaced with the physical thread identification sent from one of the other cores. The thread mapping hardware unit may send an invalidate request to the buffers of the other cores to invalidate the logical to physical thread mapping in response to a request of the first core to invalidate the logical to physical thread mapping. The thread mapping hardware unit may track an acknowledgement from each of the other cores to mark the invalidate request as complete when the acknowledgment from each core is received.

In another embodiment, an apparatus includes a hardware processor with a plurality of cores that each include a buffer to store a logical to physical thread mapping, and a data storage device that stores code that when executed by the hardware processor causes the hardware processor to perform the following: returning a physical thread identification in response to a logical thread identification sent to a buffer of a first core when the buffer includes a logical to physical thread mapping for the logical thread identification, and sending a request to the buffers of the other cores when the buffer of the first core does not include the logical to physical thread mapping for the logical thread identification, wherein each of the other cores are to send an unknown identification response if their buffer does not include the logical to physical thread mapping for the logical thread identification and at least one of the other cores is to send the physical thread identification to the first core if its buffer includes the logical to physical thread mapping for the logical thread identification. The data storage device may further store code that when executed by the hardware processor causes the hardware processor to perform the following: simultaneously broadcasting the request to the buffers of the other cores. The data storage device may further store code that when executed by the hardware processor causes the hardware processor to perform the following: replacing a least recently used entry in the buffer of the first core with the physical thread identification sent from one of the other cores. The data storage device may further store code that when executed by the hardware processor causes the hardware processor to perform the following: sending an invalidate request to the buffers of the other cores to invalidate the logical to physical thread mapping in response to a request of the first core to invalidate the logical to physical thread mapping. The data storage device may further store code that when executed by the hardware processor causes the hardware processor to perform the following: tracking an acknowledgement from each of the other cores to mark the invalidate request as complete when the acknowledgment from each core is received.

In yet another embodiment, a method includes returning a physical thread identification in response to a logical thread identification sent to a buffer of a first core when the buffer includes a logical to physical thread mapping for the logical thread identification, wherein the first core is one of a plurality of cores of a hardware processor that each include a buffer to store a logical to physical thread mapping, and sending a request to the buffers of the other cores when the buffer of the first core does not include the logical to physical thread mapping for the logical thread identification, wherein each of the other cores are to send an unknown identification response if their buffer does not include the logical to physical thread mapping for the logical thread identification and at least one of the other cores is to send the physical thread identification to the first core if its buffer includes the logical to physical thread mapping for the logical thread identification. The method may include simultaneously broadcasting the request to the buffers of the other cores. The method may include replacing a least recently used entry in the buffer of the first core with the physical thread identification sent from one of the other cores. The method may include sending an invalidate request to the buffers of the other cores to invalidate the logical to physical thread mapping in response to a request of the first core to invalidate the logical to physical thread mapping. The method may include tracking an acknowledgement from each of the other cores to mark the invalidate request as complete when the acknowledgment from each core is received.

In another embodiment, a data storage device that stores code that when executed by a hardware processor causes the hardware processor to perform the following: returning a physical thread identification in response to a logical thread identification sent to a buffer of a first core when the buffer includes a logical to physical thread mapping for the logical thread identification, wherein the first core is one of a plurality of cores of a hardware processor that each include a buffer to store a logical to physical thread mapping, and sending a request to the buffers of the other cores when the buffer of the first core does not include the logical to physical thread mapping for the logical thread identification, wherein each of the other cores are to send an unknown identification response if their buffer does not include the logical to physical thread mapping for the logical thread identification and at least one of the other cores is to send the physical thread identification to the first core if its buffer includes the logical to physical thread mapping for the logical thread identification. The data storage device may further store code that when executed by the hardware processor causes the hardware processor to perform the following: simultaneously broadcasting the request to the buffers of the other cores. The data storage device may further store code that when executed by the hardware processor causes the hardware processor to perform the following: replacing a least recently used entry in the buffer of the first core with the physical thread identification sent from one of the other cores. The data storage device may further store code that when executed by the hardware processor causes the hardware processor to perform the following: sending an invalidate request to the buffers of the other cores to invalidate the logical to physical thread mapping in response to a request of the first core to invalidate the logical to physical thread mapping. The data storage device may further store code that when executed by the hardware processor causes the hardware processor to perform the following: tracking an acknowledgement from each of the other cores to mark the invalidate request as complete when the acknowledgment from each core is received.

An apparatus may include means for returning a physical thread identification in response to a logical thread identification sent to a buffer of a first core when the buffer includes a logical to physical thread mapping for the logical thread identification, wherein the first core is one of a plurality of cores of a hardware processor that each include a buffer to store a logical to physical thread mapping, and means for sending a request to the buffers of the other cores when the buffer of the first core does not include the logical to physical thread mapping for the logical thread identification, wherein each of the other cores are to send an unknown identification response if their buffer does not include the logical to physical thread mapping for the logical thread identification and at least one of the other cores is to send the physical thread identification to the first core if its buffer includes the logical to physical thread mapping for the logical thread identification. An apparatus to translate a logical thread identification to a physical thread identification may be as described in the detailed description. A method for translating a logical thread identification to a physical thread identification may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 7A is a block diagram illustrating both an exemplary in-order pipeline and an exemplary register renaming, out-of-order issue/execution pipeline according to embodiments of the disclosure. FIG. 7B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the disclosure. In one embodiment, an instruction decode unit 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the disclosure may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network may ensure coherency for shared data. The ring network may be bi-directional to allow agents such as processor cores, L2 caches and other logic blocks to communicate with each other within the chip. Each ring data-path may be 1012-bits wide per direction.

FIG. 8B is an expanded view of part of the processor core in FIG. 8A according to embodiments of the disclosure. FIG. 8B includes an L1 data cache 806A part of the L1 cache 804, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Figure 9:
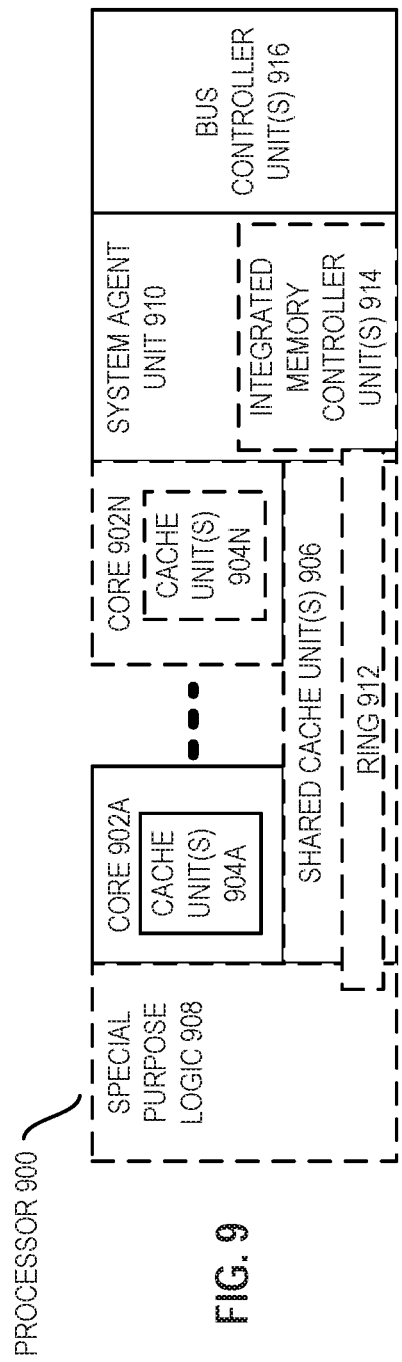
FIG. 9 is a block diagram of a processor that may have more than one core, may have an integrated memory controller, and may have integrated graphics according to embodiments of the disclosure.

FIG. 9 is a block diagram of a processor 900 that may have more than one core, may have an integrated memory controller, and may have integrated graphics according to embodiments of the disclosure. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
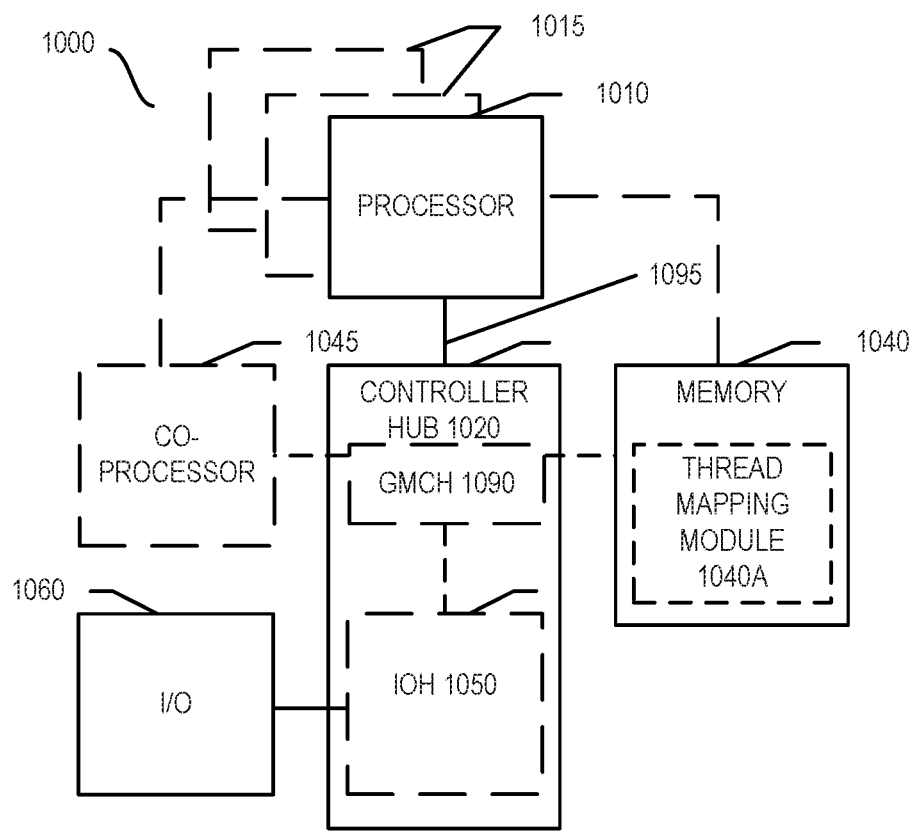
FIG. 10 is a block diagram of a system in accordance with one embodiment of the present disclosure.

Referring now to FIG. 10, shown is a block diagram of a system 1000 in accordance with one embodiment of the present disclosure. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050. Memory 1040 may include a thread mapping module 1040A, for example, to store code that when executed causes a processor to perform any method of this disclosure.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
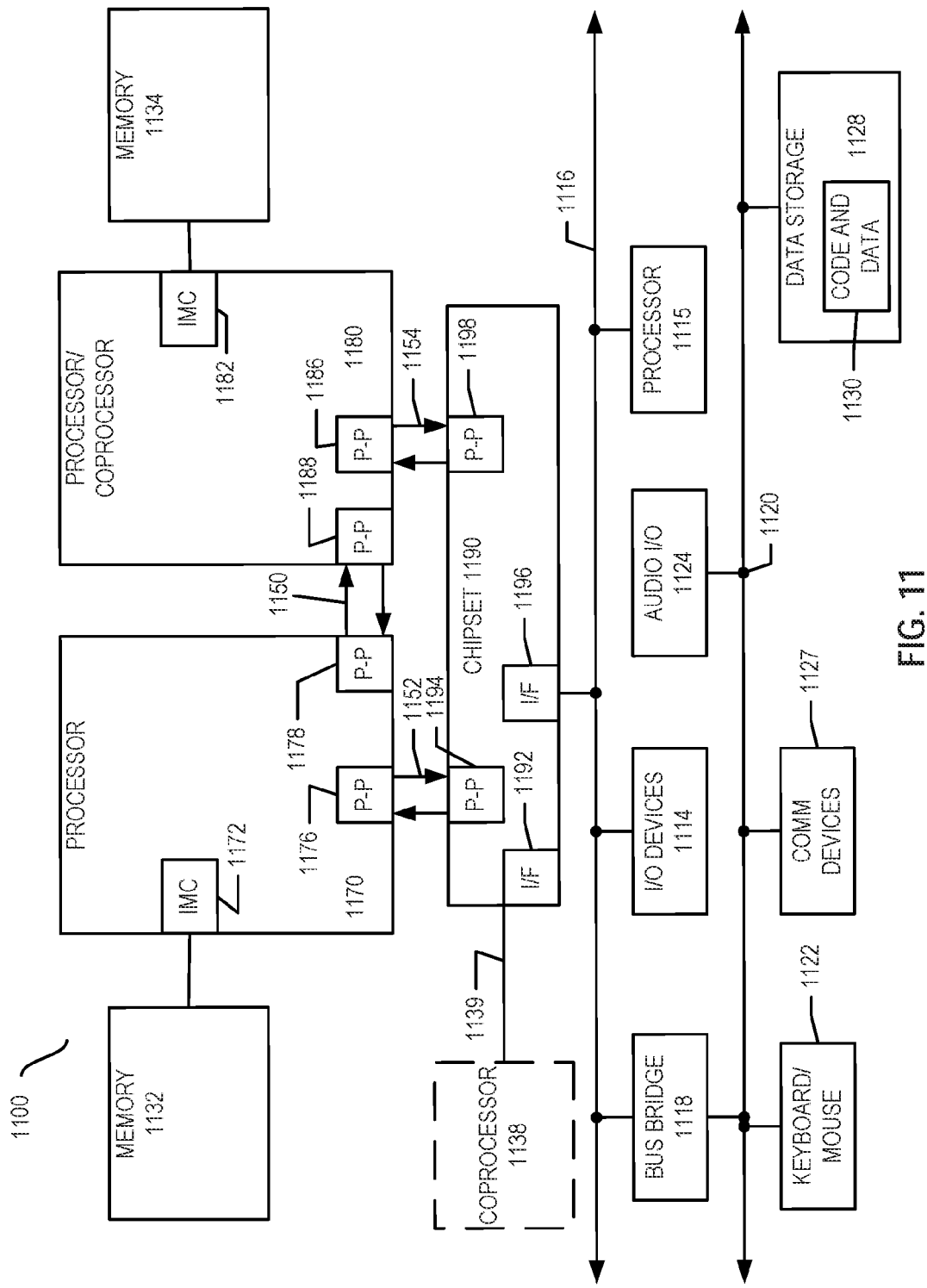
FIG. 11 is a block diagram of a more specific exemplary system in accordance with an embodiment of the present disclosure.

Referring now to FIG. 11, shown is a block diagram of a first more specific exemplary system 1100 in accordance with an embodiment of the present disclosure. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the disclosure, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present disclosure is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
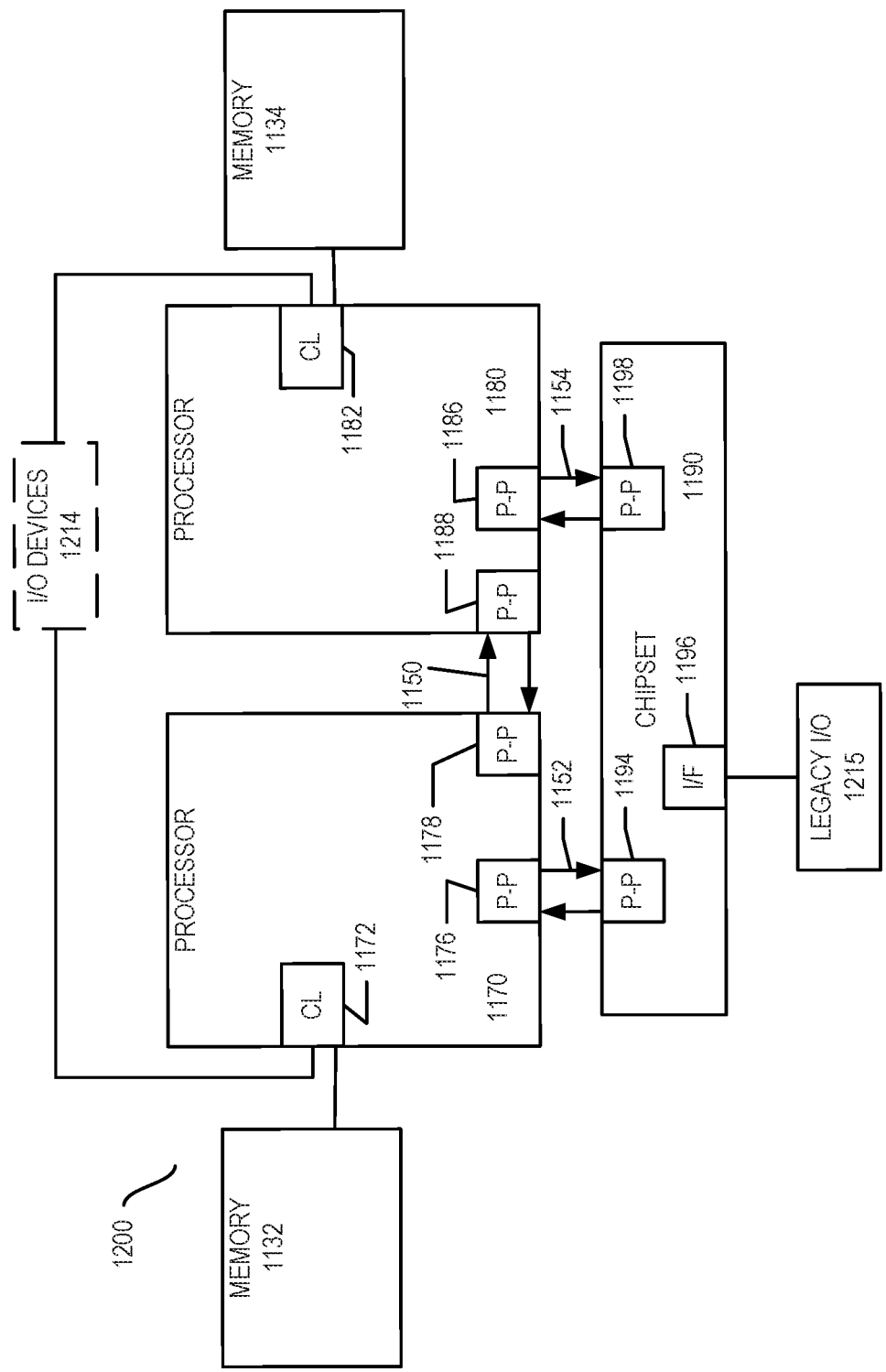
FIG. 12, shown is a block diagram of a second more specific exemplary system in accordance with an embodiment of the present disclosure.

Referring now to FIG. 12, shown is a block diagram of a second more specific exemplary system 1200 in accordance with an embodiment of the present disclosure. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
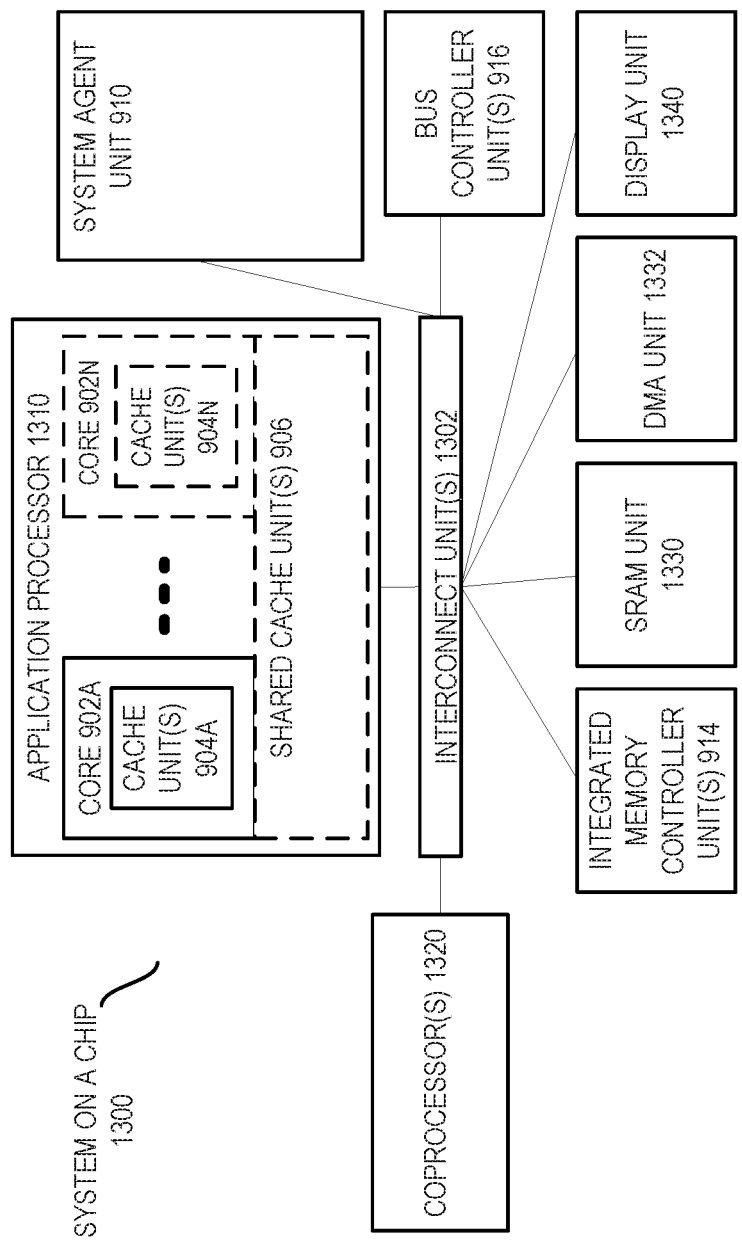
FIG. 13, shown is a block diagram of a system on a chip (SoC) in accordance with an embodiment of the present disclosure.

Referring now to FIG. 13, shown is a block diagram of a SoC 1300 in accordance with an embodiment of the present disclosure. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 202A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 14 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

What is claimed is:
1. A hardware processor comprising:
 a plurality of cores that each include a buffer to store a logical to physical thread mapping; and
 a thread mapping hardware unit to:
  return a physical thread identification in response to a logical thread identification sent to a buffer of a first core when the buffer includes a logical to physical thread mapping for the logical thread identification, and send a request to the buffers of the other cores when the buffer of the first core does not include the logical to physical thread mapping for the logical thread identification, wherein each of the other cores are to send an unknown identification response if their buffer does not include the logical to physical thread mapping for the logical thread identification and at least one of the other cores is to send the physical thread identification to the first core if its buffer includes the logical to physical thread mapping for the logical thread identification.

2. The hardware processor of claim 1, wherein the thread mapping hardware is to simultaneously broadcast the request to the buffers of the other cores.

3. The hardware processor of claim 1, wherein a least recently used entry in the buffer of the first core is to be replaced with the physical thread identification sent from one of the other cores.

4. The hardware processor of claim 1, wherein the thread mapping hardware unit is to send an invalidate request to the buffers of the other cores to invalidate the logical to physical thread mapping in response to a request of the first core to invalidate the logical to physical thread mapping.

5. The hardware processor of claim 4, wherein the thread mapping hardware unit is to track an acknowledgement from each of the other cores to mark the invalidate request as complete when the acknowledgment from each core is received.

6. An apparatus comprising:
a hardware processor with a plurality of cores that each include a buffer to store a logical to physical thread mapping; and
a data storage device that stores code that when executed by the hardware processor causes the hardware processor to perform the following:
returning a physical thread identification in response to a logical thread identification sent to a buffer of a first core when the buffer includes a logical to physical thread mapping for the logical thread identification, and
sending a request to the buffers of the other cores when the buffer of the first core does not include the logical to physical thread mapping for the logical thread identification, wherein each of the other cores are to send an unknown identification response if their buffer does not include the logical to physical thread mapping for the logical thread identification and at least one of the other cores is to send the physical thread identification to the first core if its buffer includes the logical to physical thread mapping for the logical thread identification.

7. The apparatus of claim 6, wherein the data storage device further stores code that when executed by the hardware processor causes the hardware processor to perform the following:
simultaneously broadcasting the request to the buffers of the other cores.

8. The apparatus of claim 6, wherein the data storage device further stores code that when executed by the hardware processor causes the hardware processor to perform the following:
replacing a least recently used entry in the buffer of the first core with the physical thread identification sent from one of the other cores.

9. The apparatus of claim 6, wherein the data storage device further stores code that when executed by the hardware processor causes the hardware processor to perform the following:
sending an invalidate request to the buffers of the other cores to invalidate the logical to physical thread mapping in response to a request of the first core to invalidate the logical to physical thread mapping.

10. The apparatus of claim 9, wherein the data storage device further stores code that when executed by the hardware processor causes the hardware processor to perform the following:
tracking an acknowledgement from each of the other cores to mark the invalidate request as complete when the acknowledgment from each core is received.

11. A method comprising:
returning a physical thread identification in response to a logical thread identification sent to a buffer of a first core when the buffer includes a logical to physical thread mapping for the logical thread identification, wherein the first core is one of a plurality of cores of a hardware processor that each include a buffer to store a logical to physical thread mapping; and
sending a request to the buffers of the other cores when the buffer of the first core does not include the logical to physical thread mapping for the logical thread identification, wherein each of the other cores are to send an unknown identification response if their buffer does not include the logical to physical thread mapping for the logical thread identification and at least one of the other cores is to send the physical thread identification to the first core if its buffer includes the logical to physical thread mapping for the logical thread identification.

12. The method of claim 11, further comprising simultaneously broadcasting the request to the buffers of the other cores.

13. The method of claim 11, further comprising replacing a least recently used entry in the buffer of the first core with the physical thread identification sent from one of the other cores.

14. The method of claim 11, further comprising sending an invalidate request to the buffers of the other cores to invalidate the logical to physical thread mapping in response to a request of the first core to invalidate the logical to physical thread mapping.

15. The method of claim 14, further comprising tracking an acknowledgement from each of the other cores to mark the invalidate request as complete when the acknowledgment from each core is received.

16. A data storage device that stores code that when executed by a hardware processor causes the hardware processor to perform the following:
returning a physical thread identification in response to a logical thread identification sent to a buffer of a first core when the buffer includes a logical to physical thread mapping for the logical thread identification, wherein the first core is one of a plurality of cores of a hardware processor that each include a buffer to store a logical to physical thread mapping; and
sending a request to the buffers of the other cores when the buffer of the first core does not include the logical to physical thread mapping for the logical thread identification, wherein each of the other cores are to send an unknown identification response if their buffer does not include the logical to physical thread mapping for the logical thread identification and at least one of the other cores is to send the physical thread identification to the first core if its buffer includes the logical to physical thread mapping for the logical thread identification.

17. The data storage device of claim 16 that further stores code that when executed by the hardware processor causes the hardware processor to perform the following:
   simultaneously broadcasting the request to the buffers of the other cores.

18. The data storage device of claim 16 that further stores code that when executed by the hardware processor causes the hardware processor to perform the following:
   replacing a least recently used entry in the buffer of the first core with the physical thread identification sent from one of the other cores.

19. The data storage device of claim 16 that further stores code that when executed by the hardware processor causes the hardware processor to perform the following:
   sending an invalidate request to the buffers of the other cores to invalidate the logical to physical thread mapping in response to a request of the first core to invalidate the logical to physical thread mapping.

20. The data storage device of claim 19 that further stores code that when executed by the hardware processor causes the hardware processor to perform the following:
   tracking an acknowledgement from each of the other cores to mark the invalidate request as complete when the acknowledgment from each core is received.

* * * * *